(12) United States Patent
Maruyama

(10) Patent No.: US 6,533,701 B2
(45) Date of Patent: Mar. 18, 2003

(54) VEHICLE CLUTCH ENGAGEMENT CONDITION DETERMINING APPARATUS AND GEAR SHIFT CONTROL APPARATUS UTILIZING THE SAME DETERMINING APPARATUS

(75) Inventor: Taiji Maruyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,260

(22) Filed: Nov. 19, 2001

(65) Prior Publication Data

US 2002/0060114 A1 May 23, 2002

(30) Foreign Application Priority Data

Nov. 22, 2000 (JP) .................................. 2000-355625

(51) Int. Cl.[7] .............................................. B60K 41/28
(52) U.S. Cl. .............................................. 477/5; 477/3
(58) Field of Search ........................ 477/3, 5; 180/65.2; 290/7, 9, 45; 318/1, 12, 432

(56) References Cited

U.S. PATENT DOCUMENTS 5,337,848 A * 8/1994 Bader ........................ 180/65.2
5,713,425 A * 2/1998 Buschhaus et al. ........ 180/65.2
5,993,350 A * 11/1999 Lawrie et al. ................. 477/5
6,159,127 A * 12/2000 Loeffler et al. ............... 477/5

FOREIGN PATENT DOCUMENTS

JP          11-69509          9/1999

* cited by examiner

Primary Examiner—Ankur Parekh
(74) Attorney, Agent, or Firm—Arent Fox Kintner Plotkin & Kahn, PLLC

(57) ABSTRACT

A vehicle clutch engagement condition determining apparatus determines the engagement condition of a clutch for disengaging an engine from a transmission. This determining apparatus estimates a motor speed corresponding value through an ECU, sets the motor speed corresponding value to the target speed of an electric motor when a gear shift lever of the transmission is operated, determines a control current value for controlling the speed of the electric motor so that the speed of the electric motor detected matches the target speed while drive wheels are driven by the electric motor and determines the engagement condition of the clutch based on an electric current deviation.

5 Claims, 5 Drawing Sheets

VEHICLE CLUTCH ENGAGEMENT CONDITION DETERMINING APPARATUS AND GEAR SHIFT CONTROL APPARATUS UTILIZING THE SAME DETERMINING APPARATUS

BACKGROUND OF THE INVENTION

1. Field of the Invention

The present invention relates to a clutch engagement condition determining apparatus for a vehicle in which drive wheels are driven by an engine by way of a multi-staged transmission, and while the transmission is in operation in association with a gear shift lever operation thereof, the engine is disconnected from the transmission by means of a clutch whereas the drive wheels are driven by an electric motor, and a gearshift control apparatus utilizing the same determining apparatus.

2. Description of the Related Art

An engagement condition determining apparatus described in JP-A-11-69509 has conventionally been known as an engagement condition determining apparatus of the aforesaid type. The vehicle includes a multi-staged transmission for connecting an engine to a differential gear mechanism, a clutch for selectively bringing the multi-staged transmission into and out of engagement with the engine and an actuator for causing the clutch to switch between engaged and disengaged conditions. In addition, the engagement condition determining apparatus is adapted to determine whether the clutch is in an engaged condition or in a disengaged condition by detecting the stroke of the clutch. In this case, the detection of the stroke of the clutch is effected by detecting the traveling distance of the actuator by means of a sensor.

With the aforesaid conventional engagement condition determining apparatus, the sensor for detecting the traveling distance of the actuator is needed to determine whether the clutch is in the engaged or disengaged condition. Therefore, the sensor has to be accommodated within a narrow space such as in a transmission case and disposed near the clutch which tends to generate heat of high temperatures. Consequently, it becomes difficult to secure a space where the sensor is installed and to obtain the wiring of the sensor properly, and the sensor is required to be provided with a certain degree of heat resistance. As a result, this results in increase in production cost.

SUMMARY OF THE INVENTION

The invention was made with a view to solving the problem, and an object thereof is to provide a vehicle clutch engagement condition determining apparatus which can properly determine whether the clutch is in an engaged condition or a disengaged condition without employing an exclusive detecting device such as a sensor and reduce the production costs and a gearshift control apparatus employing the same engagement condition determining apparatus.

With a view to attaining the object, according to a first aspect of the invention, there is provided a vehicle clutch 5 engagement condition determining apparatus 1 for a vehicle in which drive wheels 4 are driven by an engine 2 by way of a multi-staged transmission 10, the transmission 10 is actuated in association with the operation of a gear shift of the transmission 10, and while the transmission 10 is in operation the engine 2 is disconnected from the transmission 10 by means of a clutch 5 whereas the drive wheels 4 are driven by an electric motor 3, the automobile clutch 5 engagement condition determining apparatus 1 comprising a vehicle speed parameter detecting means (a motor speed sensor 36, an ECU 40, steps 4, 6) for detecting a vehicle speed parameter (motor speed NM, motor speed corresponding value NMCAL) representing the speed status of the vehicle, a gear shift operation detecting means (a shift position sensor 37, ECU 40, step 2) for detecting whether of not the gear shift operation has been executed, a target vehicle speed parameter setting means (ECU 40, step 5) for setting a target vehicle speed parameter (a target speed NOBJ) based on a vehicle speed parameter (motor speed corresponding value NMCAL) detected by the vehicle speed parameter detecting means when the execution of the gear shift operation is detected by the gear shift operation detecting means (when the result of determination in step 2 is YES), a control signal value determining means (ECU 40, steps 6, 7) for determining a control signal value (a control current value I) for controlling the revolution of the electric motor 3 so that the detected vehicle speed parameter (motor speed NM) matches a target vehicle speed parameter (a target speed NOBJ) set by the target vehicle speed parameter setting means while the drive wheels 4 are driven by the electric motor 3, a varying condition detecting means (ECU 40, step 8) for detecting the varying condition (an electric current value deviation DI) of a control signal value determined by the control signal value detecting means, and an engagement condition determining means (ECU 40, steps 11 to 15) for determining the engagement condition of the clutch 5 according to the varying condition (the electric current value deviation ID) of a control signal value detected by the varying condition detecting means.

According to the automobile clutch engagement condition detecting apparatus, the rotating condition of the drive wheels is detected, so that whether or not the gear shift operation has been effected is detected, and when it is detected that the gear shift operation has been executed the target vehicle speed parameter is set based on the detected vehicle speed parameter. Furthermore, the control signal value for controlling the rotation of the electric motor is determined so that the detected vehicle speed parameter matches the target vehicle speed parameter while the drive wheels are driven by the electric motor, and the varying condition of the control signal value is detected. Then, the engagement condition of the clutch is determined according to the detected varying condition of the control signal value.

Thus, when the transmission operates in association with the operation of the gear shift thereof, the control signal value of the electric motor is set such that the vehicle speed parameter matches the target vehicle speed parameter determined based on the vehicle speed parameter when the gear shift operation is executed. Consequently, even if the driving force of the engine that is conveyed to the drive wheels is reduced due to the clutch switching from the engaged condition to the disengaged condition in association with the start of operation of the transmission, since the control signal value of the electric motor is controlled as described above, the speed status of the vehicle is maintained so as not to alter. Owing to this, the engagement condition of the clutch is reflected on the varying condition of the control signal value of the electric motor and therefore the engagement condition of the clutch while the transmission is in operation can properly be determined according to the results of detection of varying conditions, whereby differently from the conventional example, the necessity is obviated of the exclusive sensor for detecting the traveling distance of the actuator. This results in omission of the sensor and work involved in getting the sensor wired properly, whereby the production costs can be reduced. In addition, since there is no need to secure a space for installation of the sensor, the transmission case incorporating therein the cutch and the transmission itself can be made compact (note that when references are made to the "detection of a vehicle speed parameter" and "detection of a control signal value" in this specification the "detection" is not limited to a direct detection by a sensor but may include the estimation through calculation).

According to a second aspect of the invention, there is provided a vehicle clutch 5 engagement condition determining apparatus 1 as set forth in the first aspect of the invention, wherein the vehicle speed parameter is either of a vehicle speed and a vehicle acceleration.

According to the automotive clutch engagement condition determining apparatus, since the control signal value of the electric motor is set so that the vehicle speed or vehicle acceleration matches the target vehicle speed or target vehicle acceleration determined based on the vehicle speed or vehicle acceleration when the gear shift operation is executed, the vehicle speed or vehicle acceleration is maintained so as not to change while the transmission is in operation. Consequently, as has been described above, the engagement condition of the clutch can properly be determined according to the varying condition of the control signal value of the electric motor.

According a third aspect of the invention, there is provided a gearshift control apparatus 41 comprising a vehicle clutch 5 engagement condition determining apparatus 1 as set forth in the first aspect of the invention a transmission driving means (first to fifth speed actuators 31 to 33) for driving the transmission 10 and a gear shift control means (ECU 40) for shifting gear stages of the transmission 10 by controlling the transmission driving means when the clutch 5 is determined as being in a disengaged condition (when the results of determination in steps 11 to 13 are YES) by the engagement condition determining means.

According to the gearshift control apparatus, when the clutch is determined as being in the disengaged condition by the engagement condition determination apparatus as set forth in claim 1, the gear stages or gear ratio steps of the transmission are changed. Namely, the gear stages of the transmission can be changed at appropriate timings based on the results of determination of the engagement condition of the clutch by the engagement condition determining apparatus.

BRIEF DESCRIPTION OF THE DRAWINGS

FIGS. 5A to 5I are diagrams showing a process illustrated in FIGS. 3 and 4 and an example of timing chart resulting when a gearshift control process is executed.

DETAILED DESCRIPTION OF THE PREFERRED EMBODIMENTS

Figure 1:
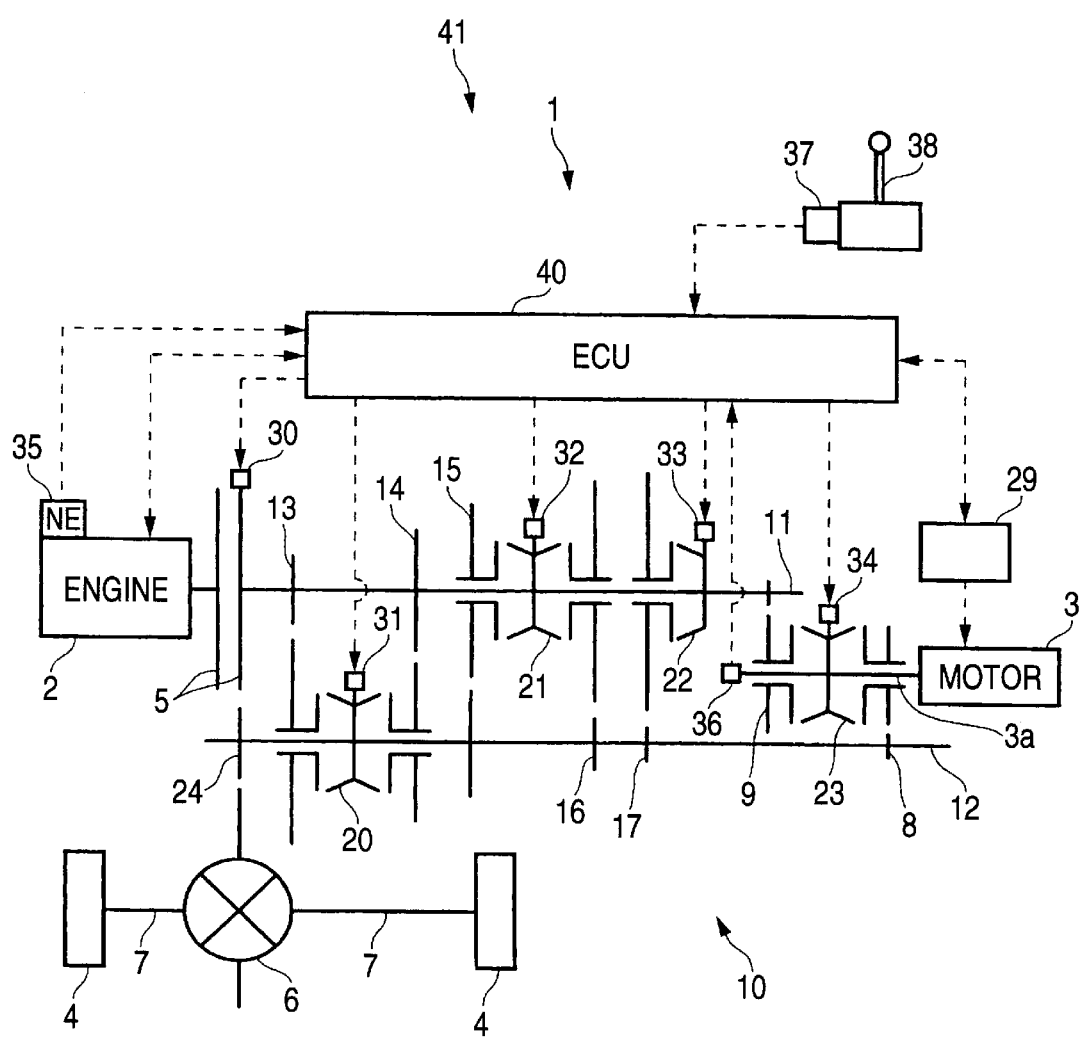
FIG. 1 is an explanatory view showing the schematic constructions of a vehicle clutch engagement condition determining apparatus, a gearshift control apparatus employing the same condition determining apparatus and a drive train utilizing both the apparatuses.

A description will be given of a vehicle clutch engagement determining apparatus and a gearshift control apparatus according to an embodiment of the invention with reference to the appended drawings. FIG. 1 is a schematic view showing the engagement condition determining apparatus 1 and the gearshift control apparatus 41 according to the embodiment of the invention, as well as a drive train of a vehicle (not shown) to which the apparatuses are applied. This vehicle is a vehicle of a hybrid type in which an engine 2 and an electric motor 3 (hereinafter, referred to as a "motor") which are installed on the vehicle are selectively connected to drive wheels 4 thereof. The vehicle further includes a clutch 5, a transmission 10, a differential gear mechanism 6 and drive axles 7, 7. The engine 2 is connected to the drive wheels 4, 4 via the clutch 5, the transmission 10, the differential gear mechanism 6 and the drive axles 7, 7. The motor 3 is connected to the drive wheels 4, 4 via the transmission 10, the differential gear mechanism 6 and the drive axles 7, 7.

An engine speed sensor 35 is provided on the engine 2. This engine speed sensor 35 detects the engine speed NE and sends a detection signal to an ECU 40, which will be described later.

Figure 2:
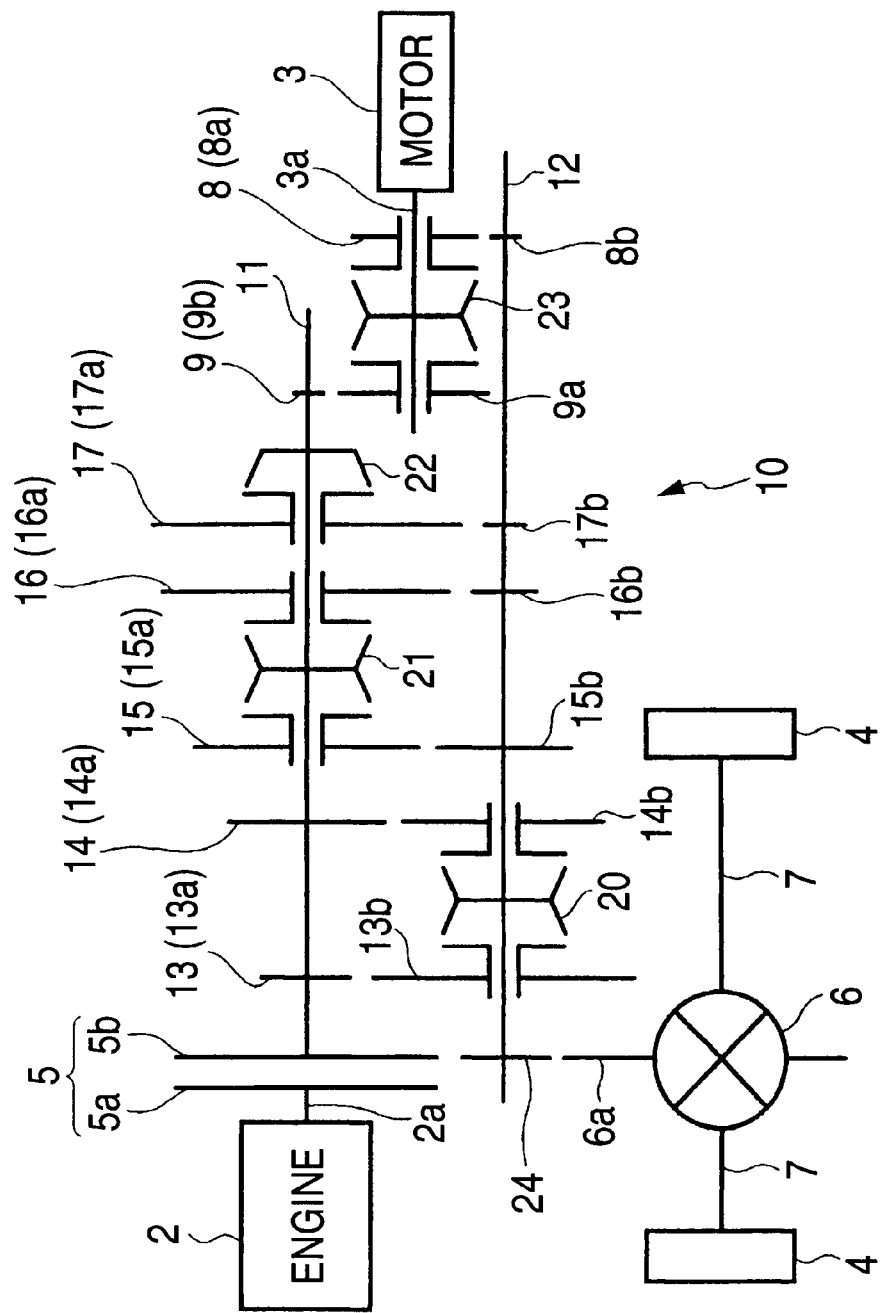
FIG. 2 is a construction diagram showing the schematic construction of the drive train of the vehicle.

As shown in FIG. 2, the clutch 5 includes a clutch plate 5a coupled to a crankshaft 2a of the engine 2 and a clutch plate 5b coupled to an input shaft 11 of the transmission 10 and pairing with the clutch plate 5a. A clutch driving actuator 30 is provided on the clutch 5. The clutch driving actuator 30 is electrically connected to the ECU 40, which will be described later, and is controlled by a clutch driving signal from the ECU 40, so as to switch the clutch 5 between an engaged condition and a disengaged condition.

To be specific, as an example is shown in FIG. 5, the clutch driving actuator 30 is constructed so as to switch the clutch 5 from the engaged condition to the disengaged condition when the level of a clutch driving signal is reversed from the "H" to the "L," and from the disengaged condition to the engaged condition when the level is reversed from the "L" to the "H."

As will be described later, the transmission 10 is an automatic transmission in which actuators 31 to 34 are driven by the ECU 40 in association with the operation of a gear shift lever 38 (gear shift lever operation). As shown in FIG. 2, the transmission 10 comprises an input shaft 11, which is a main shaft, an output shaft 12, which is a counter shaft, pairs 13 to 17 of forward first to fifth speed gears, a reverse gear shaft and a reverse gear train (the latter two being not shown). The input shaft 11, the output shaft 12 and the reverse gear shaft are disposed in parallel to each other.

The pairs 13 to 17 of forward first to fifth speed gears are constituted by input side forward first to fifth speed gears 13a to 17a which are mounted on the input shaft 11 and output side forward first to fifth speed gears 13b to 17b which are mounted on the output shaft 12. The gears 13a to 17a and 13b to 17b constituting the pair are normally meshed with each other. The respective pairs 13 to 17 of forward first to fifth speed gears are set to have different gear ratios.

Of these gears, the input shaft forward first to second speed gears 13a to 14a are provided integrally with the input shaft 11. On the other hand, the output shaft forward first to second speed gears 13b to 14b are constituted by idle gears which are rotatable relative to the output shaft 12, and are engaged with and disengaged from the output shaft 12 by way of a first and second speed clutch 20. A first and second speed actuator 31 is provided on this first and second speed clutch 20. This first and second speed actuator 31 (a transmission driving means) is electrically connected to the ECU 40 and is controlled by the ECU 40 so that the output shaft forward first speed gear 13b and the output shaft forward second speed gear 14b are selectively engaged with output shaft 12 by way of a first and second speed clutch 20 or both the gears 13b, 14b are disconnected from the output shaft 12 simultaneously by way of the first and second speed clutch 20. Accordingly, the input shaft 11 and the output shaft 12 are engaged with or disengaged from each other via the forward first speed pair 13 of meshing gears or the forward second speed pair 14 of meshing gears.

Similarly to this, the input shaft forward third to fourth speed gears 15a to 16a are also constituted by idle gears which are rotatable relative to the input shaft 11, whereas the output shaft forward third to fourth speed gears 15b to 16b are provided integrally with the output shaft 12. In addition, a third and fourth speed actuator 32 (a transmission driving means) is controlled by the ECU 40 so that the input shaft forward third speed gear 15a and the input shaft forward fourth speed gear 16a are selectively engaged with the input shaft 11 or both the gears 15a, 16a are disengaged from the input shaft 11 simultaneously by way of a third and fourth speed clutch 21. Accordingly, the input shaft 11 and the output shaft 12 are engaged with or disengaged from each other via the forward third speed pair 15 of meshing gears or the forward fourth speed pair 16 of meshing gears.

Similarly to this, the input shaft forward fifth speed gear 17a is also constituted by an idle gear which is rotatable relative to the input shaft 11. In addition, a fifth speed actuator 33 (a transmission driving means) is controlled by the ECU 40 so that the input shaft forward fifth speed gear 17a is engaged with or disengaged from the input shaft 11 by way of a fifth speed clutch 22. Accordingly, the input shaft 11 and the output shaft 12 are engaged with or disengaged from each other by way of the forward fifth speed pair 17 of meshing gears.

Provided on a rotating shaft 3a of the motor 3 are a driving rotating shaft gear 8a, a starting rotating shaft gear 9a and a motor speed sensor 36. These driving rotating shaft gear 8a and starting rotating shaft gear 9a are constituted by idle gears which are rotatable relative to the rotating shaft 3a, as with the gears 15a to 17a, and are engaged with or disengaged from the rotating shaft 3a by way of a motor clutch 23. In addition, the motor speed sensor 36 (a vehicle speed parameter detecting means) outputs to the ECU 40 a detection signal which is a pulse signal corresponding to the rotation of the rotating shaft 3a, that is, the rotation of the motor 3. The ECU 40 computes the speed NM of the motor 3 (hereinafter, referred to as "motor speed") based on the detection signal.

On the other hand, mounted on the input shaft 11 is a starting input shaft gear 9b which constitutes a pair 9 of starting gears together with the starting rotating shaft gear 9a. This starting input shaft gear 9b is provided integrally with the input shaft 11 and normally meshes with the starting rotating shaft gear 9a. In addition, mounted on the output shaft 12 is a driving output shaft gear 8b which constitutes a pair 8 of drive gears together with the driving rotating shaft gear 8a. This driving output shaft gear 8b is also provided integrally with the output shaft 12 and normally meshes with the driving rotating shaft gear 8a.

Additionally, a switching actuator 34 is provided on the motor clutch 23. This switching actuator 34 is also controlled by the ECU 40 so that the driving rotating shaft gear 8a and the starting rotating shaft gear 9a are selectively engaged with the rotating shaft 3a or both the gears 8a, 9a are disengaged therefrom simultaneously by way of the motor clutch 23. Accordingly, the rotating shaft 3a and the output shaft 12 or the input shaft 11 are engaged with or disengaged from each other.

On the other hand, a connecting gear 24 is provided on the output shaft 12 integrally, and this connecting gear 24 normally meshes with a gear 6a of the differential gear mechanism 6. Accordingly, the drive wheels 4, 4 are driven to rotate in association with the rotation of the output shaft 12.

Furthermore, a reverse gear actuator (not shown) is provided on a reverse gear of the reverse gear train, which is provided on the reverse gear shaft. This reverse gear actuator is controlled by the ECU 40 so that the reverse gear on the reverse gear shaft meshes simultaneously with other gears of the reverse gear train which are provided on the input shaft 11 and the output shaft 12. Accordingly, the input shaft 11 and the output shaft 12 are rotated in the same direction relative to each other.

On the other hand, the motor 3 is connected to the ECU 40 via a driving circuit 29 and the rotation thereof is controlled by a driving signal (an electric current signal) from the ECU 40 as will be described later.

In addition, a gear shift lever position sensor 37 is connected to the ECU 40. This gear shift lever position sensor 37 (a gear shift lever operation detecting means) detects the position of a gear shift lever 38 and outputs to the ECU 40 a gear shift lever position signal representing the detected gear shift lever position. The ECU 40 detects whether or not the gear shift lever 38 has been operated, as well as the position of the gear shift lever 38 based on the gear shift lever position signal. Note that the gear shift lever operation is not limited to the actual operation of the gear shift lever 38 but may be any action representing the intention of the driver to perform a gear shift lever operation. For example, the gear shift lever operation may take the form of a gear shift lever by a button or a gear shift lever command via the voice of the driver.

Additionally, The ECU 40 (a vehicle speed parameter detecting means, a gear shift lever operation detecting means, a target vehicle speed parameter setting means, a control signal value determining means, a varying condition detecting means, a engagement condition determining means, a gearshift control means) is constituted by a microcomputer comprising RAM, ROM, CPU and I/O interface (any of them being not shown). The ECU 40 controls the operation of the transmission 10 according to detection signals detected by various sensors 35 to 37 so that the output torque of the engine 2 is transmitted to the drive wheels 4, 4 via the transmission 10 while the vehicle is normally running. Further, ECU also controls the speed of the motor 3 so as not to produce a rotational resistance while a coupled state is retained between the motor 3 and the output shaft 12 via the motor clutch 23 and the drive gear pair 8. In addition, the ECU 40 executes a motor rotation control process for controlling the motor 3 so that the drive wheels 4, 4 are driven by the motor 3 instead of the engine 2 when a gear shift lever operation is performed while the vehicle is running, as well as a clutch 5 engaging or disengaging operation control process, a clutch 5 engagement condition determining process and a transmission 10 gearshift control process.

Figure 3:
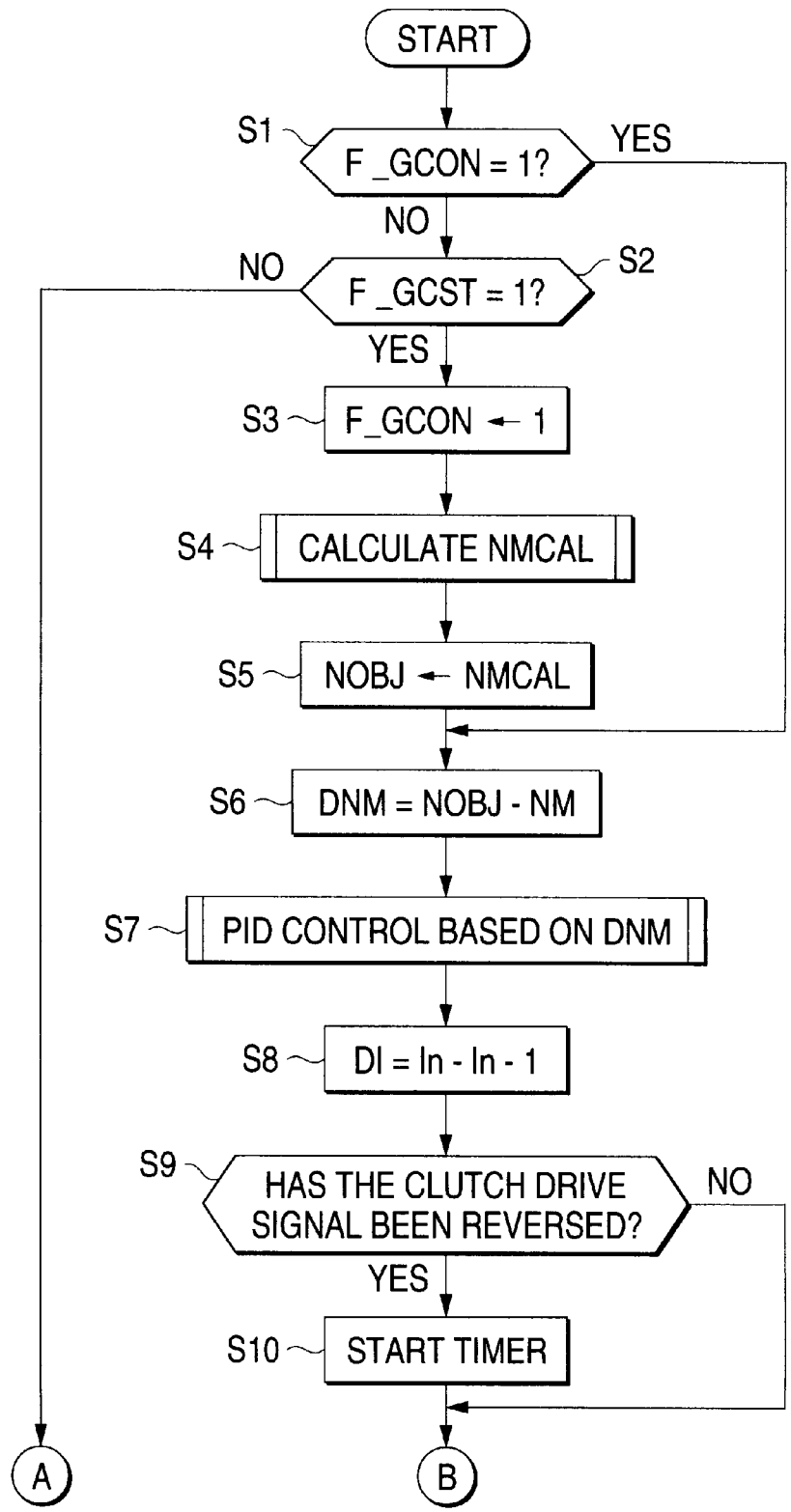
FIG. 3 is a flowchart illustrating a clutch engagement condition determining process and a motor speed control process.
Figure 4:
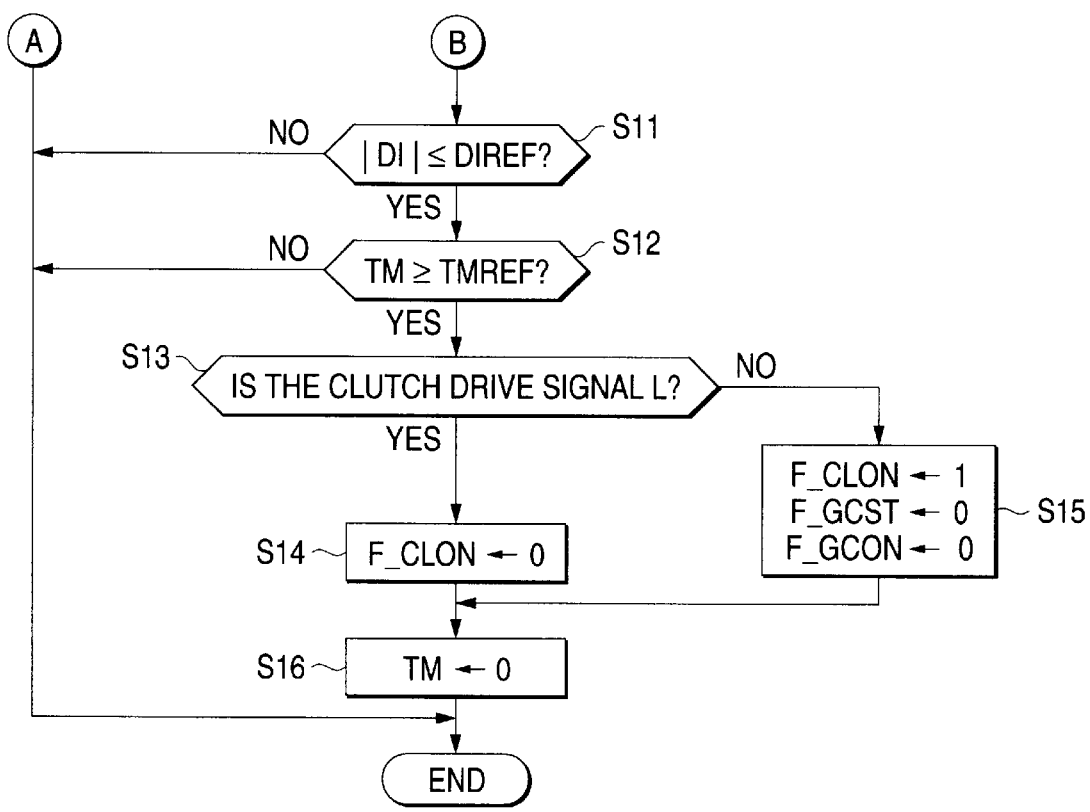
FIG. 4 is a flowchart following the one shown in FIG. 3.

Referring to FIGS. 3 and 4, of those processes the clutch engagement condition determining process and the motor rotation control process will be described below. These processes are interruption executed every predetermined period of time.

Firstly, in step 1 (in the figure abbreviated as "S1" and the same is applied to the rest of steps therein) it is determined whether or not a gearshift being executed flag F_GCON is "1". As will be described later, this gearshift being executed flag F_GCON is set at "1" during execution of the gearshift operation of the transmission 10 and is then set at "0" when the gearshift operation is completed.

In case the result of the determination in step 1 is NO, the flow proceeds to step 2, where it is determined whether or not a gear shift lever operation flag F_GCST is "1". This gear shift lever operation flag F_GCST is set at "1" when a gear shift lever position change is detected, in other words, when a gear shift lever operation is executed by the driver, and as will be described later, the flag is set at "0" when the gearshift operation of the transmission 10 is completed.

In case the result of the determination in step 2 is NO, in other words, in case the gear shift lever has not yet been operated, this process is completed. On the other hand, in case the result of the determination is YES, in other words, in case the gear shift lever operation has been executed, the execution of gearshift operation is started, and then the flow proceeds to step 3, where the gearshift being executed flag F_GCON is set at "1" to show that the gearshift operation is being executed.

Next, the flow proceeds to step 4, where a motor speed estimated value NMCAL (a vehicle speed parameter representing the speed status of the vehicle) is computed. This motor speed estimated value NMCAL is an operated value of the motor speed NM needed to maintain the current vehicle speed in a case where the drive wheels 4 are driven by the motor 3 instead of the engine 2 while the transmission is in operation. To be specific, the motor speed estimated value NMCAL is computed by computing the speed of the output shaft 12 based on the gear ratio of the current gear stage of the transmission 10 and the engine speed NM and converting the computed speed of the output shaft 12 into the motor speed NM based on the gear ratio of the drive gear pair 8.

Next, the flow proceeds to step 5 and a target speed NOBJ (a target vehicle speed parameter) is set at the motor speed estimated value NMCAL computed in step 4, and thereafter the flow proceeds to step 6, which will be described later.

Conversely, in case the result of the determination in step 1 is YES, in other words, in case the gearshift operation is being executed, the steps 2 to 5 are skipped over, and the flow proceeds to step 6.

In step 6 following step 1 or step 5, a speed deviation DNM (=NOBJ-NM) between the target speed NOBJ and the computed motor speed NM is computed. In this case, the motor speed NM (the vehicle speed parameter representing the speed status of the vehicle) is computed as a parameter representing the current vehicle speed.

Next, the flow proceeds to step 7, and a control current value I (a control signal value) for controlling the speed of the motor 3 is computed through PID control based on the speed deviation DNM computed in step 6. By controlling the speed of the motor 3 with this control current value I, the motor 3 is feedback controlled so that the motor speed NM matches the target speed NOBJ. Thus, when an engine transmission torque that is to be transmitted from the engine 2 to the drive wheels 4 gradually decreases so that the value becomes 0 (refer to FIG. 5D) due to the disengagement of the clutch 5, a motor transmission torque that is to be transmitted from the motor 3 to the drive wheels 4 increases (refer to FIG. 5G) to compensate for the decrease in the engine transmission torque. As a result, the generation of feeling can be eliminated that the driving force is lost at the time of disengagement of the clutch 5 (hereinafter, referred to as "free running feeling") while the transmission 10 is in operation.

Next, the flow proceeds to step 8, an electric current value deviation DI (=In-In-1, a parameter representing the varying condition of the control signal value) between the present value In and the previous value In-1 of the control current value I is computed. Then, the flow proceeds to step 9, and it is determined whether or not the level of a clutch driving signal has been reversed between "L" and "H". In case the result of the determination is YES, in other words, in case the level of the clutch signal value is determined as having been reversed, the flow then proceeds to step 10, where a delay timer of an up-count type is started, and thereafter the flow proceeds to step 11 shown in FIG. 4, which will be described later. Even if the clutch driving actuator 30 is activated when the clutch driving signal is reversed, there is caused a delay in response (for example, between times t0 and t1 in FIG. 5) before the clutch 5 actually starts a switching operation. Thus, the delay timer prevents an erroneous determination that would be produced when there is caused no change in the status of the clutch 5 and hence the electric current value deviation DI is maintained in a small value state during such a delay.

Conversely, in case the result of the determination in step 9 is YES, in other words, in case the clutch driving signal is not reversed, skipping over step 10, the flow proceeds to step 11 shown in FIG. 4.

In step 11 following step 9 or step 10, it is determined whether or not the absolute value |DI| of the electric current value deviation DI is equal to or less than a predetermined value DIREF or lower. In case the result of the deviation is NO, in other words, in case the electric current value deviation DI is greater than the predetermined value, the clutch 5 is determined as being in operation, and the process is completed. Conversely, in case the result of the determination is YES, in other words, in case the electric current value deviation DI is equal to or less than the predetermined value, then the flow proceeds to step 12, where it is determined whether or not the timer value TM of the delay timer is equal to or greater than a predetermined value TMREF.

In case the result of the determination is NO, in other words, in case the timer value TM is less than the predetermined value TMREF, understanding that there is a risk of an erroneous determination of the status of the clutch 5 as being in the engaged or disengaged condition due to the delay in response of the clutch 5, the process is completed. Conversely, in case the result of the determination is YES, in other words, in case the timer value TM is equal to or greater than the predetermined value TMREF, understanding that the influence on the delay in response has been eliminated, the flow then proceeds to step 13, where it is determined whether or not the level of the clutch driving signal is at the "L".

In case the result of the determination is YES, in other words, in case the level of the clutch driving signal is at the "L" understanding that the clutch 5 has been switched from the engaged condition to the disengaged condition, the flow then proceeds to step 14, where a clutch engagement flag F_CLON representing the switching of the clutch 5 is set at "0". Then, the flow proceeds to step 16, where the timer value TM is set at a value 0, and the process is completed.

Conversely, in case the result of the determination in step 13 is NO, in other words, in case the level of the clutch driving signal is at the "H", understanding that the clutch 5 has been switched from the disengaged condition to the engage condition, the flow then proceeds to step 15, the clutch engagement flag F_CLON is set at the "1" to represent the switching of the clutch 5. At the same time, understanding that the gearshift operation of the transmission 10 has been completed, both the gearshift being executed flag F_GCON and the gear shift lever operating flag F_GCST are set at "0" to represent the completion of the gearshift operation. Then, the flow proceeds to the step 16, and the timer value TM is reset to the value 0, the process being then completed.

Next, referring to a timing chart shown in FIGS. 5A to 5J, the results of the engagement condition determining process shown in to FIGS. 3 and 4 and an example of the transition of the operation of the clutch 5 and the transmission 10 will be described. FIG. 5 is illustrating the example in which the gearshift is performed from the third speed gear to the fourth speed gear while the vehicle is running.

Firstly, while the vehicle is running in the third speed gear, the motor 3 is connected to the output shaft 12 via the motor clutch 23 and the drive gear pair 8. Then, the rotation of the motor 3 is controlled to such an extent that no rotational resistance is produced. In this state, when the driver shifts the gear shift lever from the third speed gear to the fourth speed gear, the level of a clutch driving signal is reversed from "H" to "L" (refer to FIG. 5A) at timing (time t0) at which a gear shift lever position signal (not shown) is detected which represents the gear shift lever position change so made and the target speed NOBJ is set as described the above. Simultaneously, the clutch driving actuator 30 starts to drive the clutch 5, and the clutch 5 starts to change its status from the engaged condition to the disengaged condition at timing (time t1) which is delayed from the reverse of the clutch driving signal (refer to FIG. 5B).

As the clutch 5 changes its status to the disengaged condition, the engine transmission torque gradually decreases (refer to FIG. 5D). On the other hand, the control current value I gradually increases through the aforementioned PID control (refer to FIG. 5F), and in association with this, the motor transmission torque that is to be transmitted from the motor 3 to the drive wheels 4 gradually increases to compensate for decrease in the engine transmission torque (FIG. 5G). As a result, the drive wheel torque that is to be actually transmitted to the drive wheels 4 becomes a sum of the engine transmission torque and the motor transmission torque (refer to FIG. 5I)

Then, the engine torque value reaches 0 at timing (time t2) at which the clutch 5 is completely disengaged, and when the engine transmission torque of the engine 2 just before the gearshift control is started is equal to or lower than the maximum output of the motor 3 the motor transmission torque, that is, the drive wheel torque becomes the same value as the engine transmission torque just before the gearshift control is started (a condition illustrated by a solid line in FIG. 5I). At and after this timing the control current value I stays at a certain value and changes little, and the clutch 5 is determined as having been disengaged from the fact that its electric current value deviation DI becomes equal to or lower than a predetermined value DIREF. Thus, the disengagement of the clutch 5 can properly be determined based on the electric current value deviation DI. Then, the gears are shifted from the third gear to the neutral at timing that is slightly delayed from the timing at which the clutch 5 was disengaged. Thereafter, the gears are shifted from the neutral to the fourth gear.

After the gears are shifted to the fourth gear, the clutch drive signal is reversed from "L" to "H" at timing that is slightly delayed from the timing at which the gears are shifted to the fourth gear. Thereafter, the clutch 5 starts to change from the disengaged condition to the engaged condition at timing (time t4) that is slightly delayed from the timing at which the clutch drive signal was reversed, and the engine transmission torque starts to increase gradually in response to the change in the clutch status. On the other hand, the control current value I starts to decrease gradually through the aforesaid PID control, and in association with this the motor transmission torque starts to decrease gradually. Then, the engine transmission torque becomes a value corresponding to the gear ratio of the fourth gear at timing (time t5) at which the clutch 5 is re-engaged completely, and the motor transmission torque becomes a value just before the gearshift control is started. At and after this timing the control current value changes little, and the clutch 5 is determined as having been engaged completely from the fact that the electric current value deviation DI becomes equal to or lower than the predetermined value DIREF. Thus, the engagement or disengagement of the clutch 5 can properly be determined based on the electric current value deviation DI.

In addition, when the engine transmission torque just before the gearshift control is started is greater than the maximum output torque of the motor 3 at the timing (time t2) at which the clutch 5 is completely disengaged, the motor transmission torque is set to its maximum output torque. Furthermore, when the drive of the drive wheels 4 by the motor 3 is not carried out, the drive wheel torque becomes as illustrated by a broken line in FIG. 5I. Consequently, by controlling the motor transmission torque so as to stay between the value 0 and its maximum output torque the drive wheel torque can be controlled within an area hatched in FIG. 5I while the transmission 10 is in operation.

Thus, according to the engagement condition determining apparatus 1 of the embodiment of the invention, when the gear shift lever is operated while the vehicle is running, the control current value I is computed through PID feedback control based on the speed deviation DNM of the motor speed NM and the target speed NOBJ so that the motor speed NM matches the target speed NOBJ set so as to maintain the vehicle speed when the gear shift lever is operated, and the engagement condition of the clutch 5 is determined based on the electric current value deviation DI of the control current value I so computed. Consequently, when the clutch 5 has been switched to the disengaged condition completely or switched to the engaged condition completely through the operation of the transmission 10, the engagement condition of the clutch 5 while the transmission is in operation can be determined properly based on the electric current value deviation DI. Accordingly, differently from the conventional example, the necessity can be obviated of an exclusive sensor for detecting the traveling distance of the actuator or the like, and as a result, the sensor and wiring work needed for the sensor can be omitted, whereby the production costs can be reduced. In addition, no space needs to be secured for installation of the sensor, whereby the clutch 5 and the transmission 10 themselves, as well as the transmission case for accommodating the clutch 5 and the transmission 10 can be made compact.

In addition, according to the gearshift control apparatus 41 of the embodiment of the invention, the gears can be shifted properly after the clutch 5 has been disengaged completely through the aforesaid gearshift control process, and the torque from the motor 3 is transmitted to the drive wheels 4, 4 instead of the torque from the engine 2 so as to compensate for the torque from the engine 2 which is temporarily lost due to the disengagement of the clutch 5, whereby generation of the feeling of free running in association with gearshift can be avoided.

Note that the speed control of the motor 3 while gearshift is carried out is not limited to the example according to the embodiment in which the motor 3 is controlled so that the motor speed NM as a parameter representing the vehicle speed matches the target speed NOBJ but, for example as in gearshift during acceleration, the motor 3 may be controlled so that the motor speed acceleration as a parameter representing vehicle acceleration matches the target motor speed acceleration. In this case, the motor speed acceleration is computed as a deviation of the motor speed NM, and the target motor speed acceleration may be set to the motor speed acceleration when the gear shift lever is operated. According to the construction, in gearshift during acceleration, as with the aforesaid embodiment, the engagement or disengagement of the clutch 5 can be determined properly based on the varying condition of the control current value I, and the generation of lost of acceleration, that is, free running feeling in association with gearshift can be avoided.

In addition, the way of computing the motor speed corresponding value NMCAL is not limited to the way according to the embodiment in which the motor speed corresponding value NMCAL is computed based on the engine speed NE and gear ratios, and it may be computed based on speeds of the input shaft 11, the output shaft 12 and the drive wheels 4 which are detected using rotation sensors. Furthermore, the way of computing the motor speed NM is not limited to the way according to the embodiment in which the motor speed NM is computed based on the detection outputs from the motor speed sensor 36, but it may be computed based on speeds of the input shaft 11, the output shaft 12 and the drive wheels which are detected using rotation sensors.

Furthermore, the invention is not limited to the vehicle according to the embodiment in which the pair of left and right drive wheels 4, 4 are driven by the engine 2 and the motor 3 but may be applied to a vehicle in which one of the front and rear pairs of wheels is driven by the engine 2, whereas the other pair is driven by the motor 3.

Additionally, while the speed of the motor 3 is controlled so as not to produce the rotational resistance while driving in the embodiment, it maybe constructed such that the motor 3 and the output shaft 12 are disengaged from each other by means of the motor clutch 23 at any other time than when gearshift is operated and are engaged with each other only when gearshift is operated, whereby the power consumption of the motor 3 can be suppressed. Furthermore, it may be constructed such that the motor 3 is direct coupled to the drive wheels 4 without interposing the transmission 10 therebetween.

As has been described heretofore, according to the vehicle clutch engagement condition determining apparatus of the invention, the engagement or disengagement condition of the clutch can properly be determined without using exclusive detecting devices such as sensors, whereby the production costs can be reduced. In addition, according to the gearshift control apparatus employing the vehicle clutch engagement condition determining apparatus, the gears of the transmission can be changed at proper timings based on the result of determination of the engagement condition of the clutch using the engagement condition determining apparatus.

What is claimed is:

1. A clutch engagement condition determining apparatus for a vehicle, wherein drive wheels are driven by an engine by way of a multi-staged transmission, said transmission is actuated in association with the operation of a gear shift of said transmission, and while said transmission is in operation, said engine is disconnected from said transmission by means of a clutch whereas said drive wheels are driven by an electric motor, said clutch engagement condition determining apparatus comprising:

vehicle speed parameter detecting means for detecting a vehicle speed parameter representing the speed status of said vehicle;

gear shift operation detecting means for detecting whether or not the operation of said gear shift of said transmission has been executed;

target vehicle speed parameter setting means for setting a target vehicle speed parameter based on a vehicle speed parameter detected by said vehicle speed parameter detecting means when the execution of said gear shift operation is detected by said gear shift operation detecting means;

control signal value determining means for determining a control signal value which controls the revolution of said electric motor so that said detected vehicle speed parameter matches a target vehicle speed parameter set by said target vehicle speed parameter setting means while said drive wheels are driven by said electric motor;

varying condition detecting means for detecting the varying condition of a control signal value determined by said control signal value detecting means; and engagement condition determining means for determining said engagement condition of said clutch according to the varying condition of a control signal value detected by said varying condition detecting means.

2. The vehicle clutch engagement condition determining apparatus as set forth in claim 1, wherein said vehicle speed parameter is one of a vehicle speed and a vehicle acceleration.

3. The vehicle clutch engagement condition determining apparatus as set forth in claim 1, further comprising:

error determination preventing means for preventing an error determination of said engagement condition determining means due to a delay in response from the operation of said gear shift detected from said gear shift operation detecting means to the start of the operation of said clutch.

4. A gearshift control apparatus comprising:

a vehicle clutch engagement condition determining apparatus as set forth in claim 1;

transmission driving means for driving said transmission; and gearshift control means for shifting gear stages of said transmission by controlling said transmission driving means when said clutch is determined as being in a disengaged condition by said engagement condition determining means.

5. A hybrid vehicle selectively connecting an engine and an electric motor to drive wheels, wherein said drive wheels are driven by said engine by way of a multi-staged transmission, said transmission is actuated in association with the operation of a gear shift of said transmission, and while said transmission is in operation, said engine is disconnected from said transmission by means of a clutch whereas said drive wheels are driven by said electric motor, said hybrid vehicle comprising:

vehicle speed parameter detecting means for detecting a vehicle speed parameter representing the speed status of said vehicle;

gear shift operation detecting means for detecting whether of not the operation of said gear shift of said transmission has been executed;

target vehicle speed parameter setting means for setting a target vehicle speed parameter based on a vehicle speed parameter detected by said vehicle speed parameter detecting means when the execution of said gear shift operation is detected by said gear shift operation detecting means;

control signal value determining means for determining a control signal value which controls the revolution of said electric motor so that said detected vehicle speed parameter matches a target vehicle speed parameter set by said target vehicle speed parameter setting means; and electric motor driving means for driving said electric motor in accordance with the a control signal value determined by said control signal value detecting means.

\* \* \* \* \*